3,455,583
Patented July 15, 1969

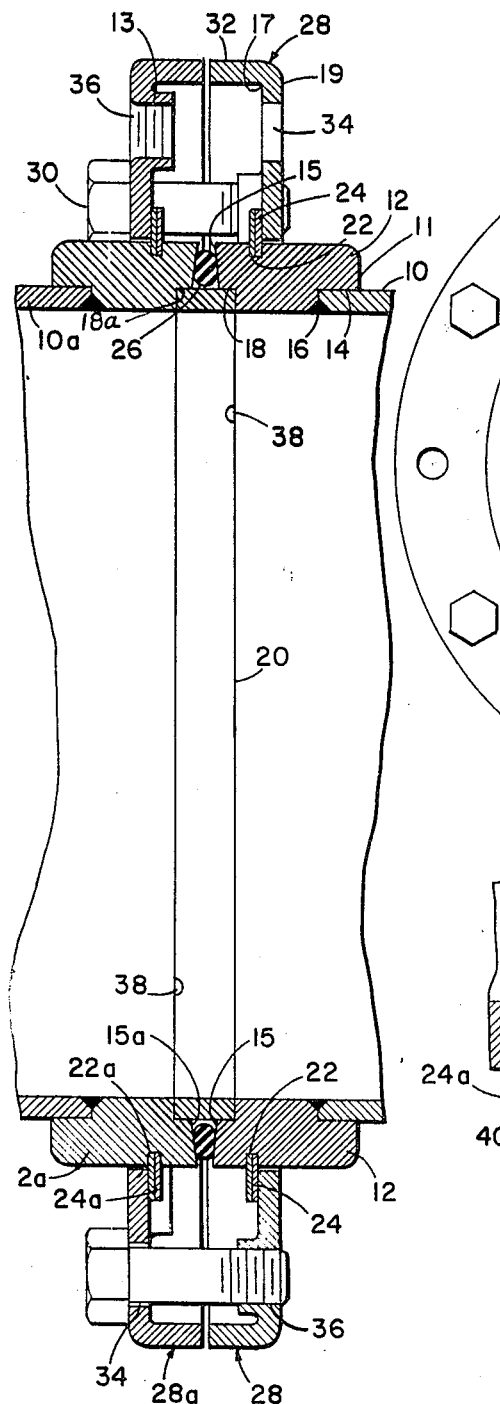
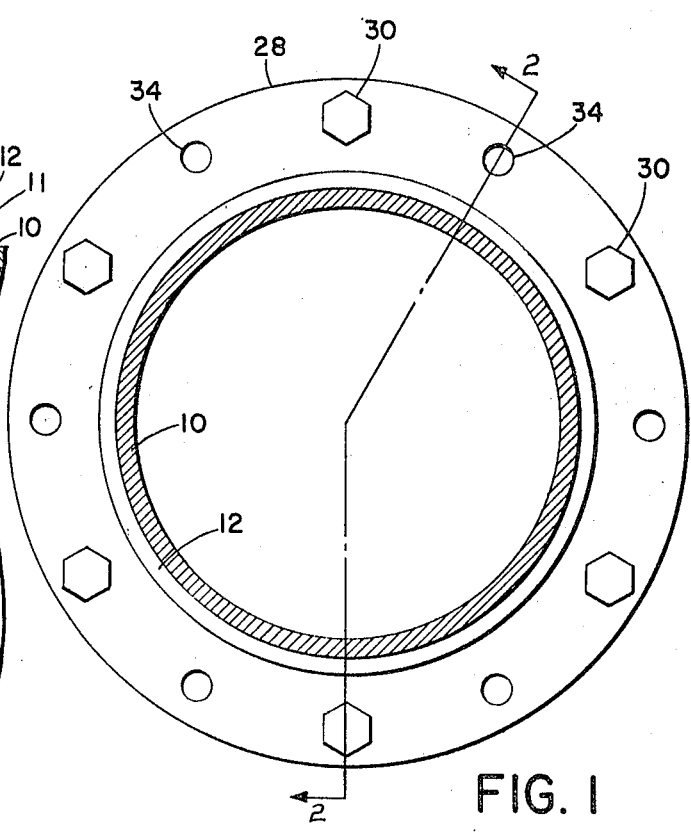
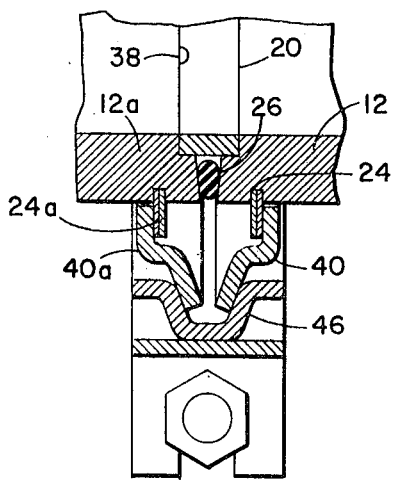
FIG. 1
FIG. 2
FIG. 3
INVENTOR
KENNETH RAY
BY Francis J. Thornton
ATTORNEY

United States Patent Office

3,455,583
VACUUM TYPE UNION
Kenneth Ray, Burlington, Mass., assignor to High Voltage Engineering Corporation, Burlington, Mass., a corporation of Massachusetts
Filed Aug. 30, 1967, Ser. No. 664,556
Int. Cl. F16l *19/00, 21/02, 23/00, 17/00*
U.S. Cl. 285—367     2 Claims

ABSTRACT OF THE DISCLOSURE

This disclosure describes a lighter, less costly and more easily handled vacuum component, such as a T, elbow, tubing or the like, which utilizes a light gauge wall having welded thereto terminations which can sustain relatively heavy compression forces. The invention is also directed to interchangeable compression couplings formed from inexpensive stamped parts which can apply to the component terminations, compressive forces sufficient to form vacuum tight joints.

Description of the invention

Vacuum systems, especially those used wtih particle accelerator systems, demand high pumping speeds and low gas evolution. Particularly such installations require rugged, easily assembled and disassembled non-magnetic components must be readily cleanable and be composed of materials with low out gassing rates that can withstand high bake out temperatures.

In general the prior art components were fabricated from heavy wall pipe for it was widely believed by those skilled in the art that weldments, in such vacuum components, was a serious source of leaks, virtual and actual. It was also believed that such heavy wall pipe was necessary to withstand the compression forces that must be applied to the component terminations to realize vacuum tight joints.

The use of such heavy wall pipe has caused considerable difficulty even though it provides satisfactory vacuum systems. It is heavy, especially when made of stainless steel, very expensive, has a poor inner surface and can have considerable out gassing. To avoid the weight and expense of stainless steel many users turned to aluminum but this material has a more serious out gassing problem and is more difficult to clean. A significant difficulty with all such pipe is that the outer diameter of the pipe can vary up to 2% which means that it becomes more difficult to clamp and join with good vacuum seals.

One of the best prior art vacuum joint couplings is shown and described in U.S. Patent No. 2,944,842 to Bernard G. E. Stiff, dated July 12, 1960. Stiff's invention consisted of a pair of machined flanges which are slipped over the ends of the vacuum pipe to be joined. The pipe has an outer annular groove machined or cut into the outer surface of the pipe termination in which could be fitted a slip ring and having a counterbore in the center thereof for accommodating a hard inner guide ring. To join such pipe the flanges were mated after a compressible annulus was slipped between the pipe ends and covered by a hard outer ring required to maintain the compressible annulus in position.

The flanges described by Stiff, although in use for over a dozen years, have serious inherent drawbacks other than those of weight and cost. For example, since pipe is manufactured with a permissible 2% variation in outside diameter the flanges have to be provided with an opening to fit over the largest possible diameter pipe which it may encounter. This can cause considerable mismatch and seal failure especially when the diameter of the pipe is at or near its minimum.

The present invention avoids this difficulty by providing pipe terminations machined to a particular tolerance and providing flanges which are also maintained within the required tolerance so that the mismatch is minimized. Further the present invention accomplishes elimination of the outer guide ring by beveling the termination of the device. Still further the present invention utilizes inexpensive stamped compression flanges which are stronger and provide significantly greater compression forces to the terminations of the device than were possible with the prior art.

Summary of the invention

Broadly speaking the present invention comprises light wall stainless steel tubing having a machined ferrule welded thereon, which ferrules are provided with an annular groove, a pair of opposing counterbores and a beveled termination, and a stamped light weight coupling or union which comprises a pair of interchangeable, stamped stainless steel flanges, a pair of retaining rings adapted to fit into the annular groove, a compressible seal and a notched inner guide ring to provide greater strength, lower cost, easier handling, greater cleanability, better seals, better vacuum, and a reduction in the number of required parts.

Specifically the weight of the components has been reduced by one-half and the cost in some cases by as much as two and one-half from their previous cost. Moreover, tubing can be provided with a surface smoother than that obtainable in pipe which leads to greater cleanliness in the system and a significant reduction in the out gassing factor. Further, the notching of the inner guide ring totally eliminates trapped air pockets in the joint and thus eliminates the possibility of sources of virtual leaks in the joint.

Description of the drawings

FIG. 1 shows a partially cross sectional view of the invention using a bolted union.

FIG. 2 shows a cross section of the bolted union of FIG. 1 taken along the line 2—2 and showing details of the flanges and the inner guide ring.

FIG. 3 shows a partially cross sectioned view of the invention using a quick opening union.

Description of the preferred embodiments

Referring now to the drawings and particularly FIGS. 1 and 2 there is shown a vacuum tight union using the features of the present invention. Stainless steel tubing 10 of 1/16 wall thickness is provided with a ferrule 12 manufactured in accordance with the present invention. Such a ferrule is fabricated from stainless steel pipe of the desired diameter. The ferrule 12 is provided at one end 11 with a counterbored seat 14 of sufficient size to accommodate the tubing 10 which is then welded thereto by a fusion weld 16 which uses no filler or flux.

The opposite end 15 of the ferrule 12 is also counterbored to provide an annular seat 18 sufficient to accommodate a removable inner guide ring 20. The terminal end surface 15 is also machined at a 5° inwardly directed radial taper so as to provide a beveled termination. This bevel not only aids in the securing of the compressible annulus required in closing the termination to form a good vacuum but further aids in the elimination of the outer guide ring and in the elimination of serious nicks, scratches, or other defects on the termination face. An annular groove 22 is machined in the outer surface of the ferrule a short distance from end 15 after the entire outer diameter of the ferrule has been reduced by machining or grinding to the desired diameter.

Any two such ferrules such as 12 and 12a with fixed tubings 10 and 10a thereon, may be joined vacuum tight. The procedure for joining these ferrules 12 and 12a is as follows. Flanges 28 and 28a, identical to one another, are slipped over their respective ferrules 12 and 12a. Each flange is formed by stamping from flat stock and thus are considerably stronger and lighter in weight than similar machined flanges. Each flange is provided with an external lip 32 and six through holes 34 alternated with six pierced and tapped holes 36. The stamping operation provides, at the junction of lip 32 with the main body of the flange, a sharp inner corner 17 and a rounded, work hardened outer corner 19. The piercing of holes 36 not only work hardens the surrounding material but also forms an extruded work hardened boss 13 which is tapped to receive suitable bolts 30.

Retaining rings 24 and 24a are then spiraled into their respective grooves 22 and 22a. The inner, stainless steel ring 20 provided with radial grooves 38 is then fitted with an elastomer O-ring 26 and placed in seat 18 of ferrule 12. The opposing ferrule 12a is then fitted over guide ring 20 such that the guide ring fits in seat 18a. The flanges 28 and 28a are then brought together and rotated so that the through holes 34 on flange 28 mate with the pierced and tapped holes 36 on flange 28a. The flanges 28 and 28a which now abut their respective snap rings 24 and 24a are then drawn together by tightening bolts 30 inserted through the through holes of one flange and threaded into the tapped holes of the other.

As the flange members 28 and 28a are drawn together by the action of bolts 30 they bear against the rings 24 and 24a to force the ferrules against inner guide ring 20 and annulus 26. Because of the bevel on the end of each ferrule the annulus is prevented from being extruded from between the faces, thus eliminating the necessity of providing an outer retaining ring.

However, since the compressible annulus 26 may be damaged if the pressure thereon is excessive and because it is not necessary that a significant amount of pressure be applied to the annulus to assure a good vacuum joint, the axial dimension of the inner ring 20 is so related to the sum of the axial dimensions of the annular seat 18 and 18a and the cross sectional dimension of the compressible annulus 20, 26 that the two ferrules 12 and 12a, when bolted together, are limited in their travel by the inner ring 20. Thus the maximum pressure on the annulus 26 is limited to a pressure sufficiently great enough to provide a vacuum tight seal between the annulus 26 and the end surfaces 15 and 15a of the ferrules 12 and 12a but not so great as to damage the compressible annulus 26. Because the inner guide ring 20 is provided with the through groove 38, the possibility of any air being trapped between the compressible annulus 26, the termination faces 15 and 15a, and the inner guide ring 20 is virtually eliminated. Although the drawings show the use of an O-ring as the compressible annulus 26 it should be obvious that other gasket materials may be utilized.

FIGURE 3 shows the same termination joined by a quick opening clamp which eliminates the necessity of handling a plurality of bolts 30. In this view the ferrules, snap ring, O-ring and inner guide ring are the same as used in FIGURE 2.

Flanges 28 and 28a have however been replaced, in this figure, with flanges 40 and 40a which have in cross section an S-shape. The unit is assembled, in a way identical to the assembly of the unit shown in FIGURE 2. Here, however, after the two ferrules 12 and 12a are brought together a quick acting clamp 46, such as sold by the Morman Co., is slipped over the flanges and tightened to tightly mate the ferrules.

All of the units in a vacuum system which use such a termination may be readily provided with either of these two types of flanges described.

Having thus described several illustrative embodiments of the vacuum tight joint of the invention and the method of constructing the same, it is to be understood that although specific terms or material are employed they are used only for descriptive purposes and not for the purposes of limitation.

I claim:
1. A union for joining together in vacuum tight manner two terminations forming part of a vacuum system each termination comprising a hollow cylindrical ferrule welded to thin wall tubing, said ferrule having a cross-sectional thickness large in comparison to the thickness of the wall of the tubing wherein the sole alterations in each standard termination are a counter bore at the inner edge of each termination, a groove in the outer surface of each pipe termination spaced a selected distance from the end thereof, and an inwardly divergent taper across the entire terminal surface of said termination comprising in combination with two said terminations each having a counter bore and a groove and such a taper as the sole alterations therein, a snap ring positioned in said groove, a stamped flange member slidably fitted over each termination and abutting against each said snap ring for purpose of drawing said terminations together, said stamped member having sharp inside corners rounded outside corners, and work hardened corners with a plurality of extruded, annular, tapped ridges evenly spaced around the circumference of said flange, and six through holes alternated with said extruded, annular, tapped ridges, a compressible annulus separating the end surfaces of said terminations, a hard inner ring confined by said counter bores within said compressible annulus, the inner surface of said rings lies substantially flush with that portion of the inner surface of each said termination which adjoins said counter bores, and having a plurality of grooves in each face through said hard inner ring to vent the outer surface of said inner ring, and means cooperating with said flange members and snap rings for clamping said terminations together to form a vacuum-tight seal capable of supporting not less than atmospheric pressure outside said vacuum system and $10^{-8}$ torr inside said vacuum system between the compressible annulus and the three surfaces surrounding it, namely the end surfaces of the terminations and the outer surface of the inner ring, said hard inner ring serving to position said compressible annulus between said end surfaces and to limit the longitudinal movement of said terminations in order to prevent excessive deformation of said compressible annulus, and said bevels serving to restrain said compressible annulus from being extruded from between the faces of said terminations.

2. A union for joining together in vacuum tight manner two terminations forming part of a vacuum system wherein the sole alterations in each standard termination are a counter bore at the inner edge of each pipe termination, a groove in the outer surface of each pipe termination spaced from the end thereof, and a 5° inwardly divergent taper on the termination surface of said pipe termination comprising in combination with two terminations each having a counter bore and a groove and such a taper as the sole alterations therein, a snap ring positioned in said groove, a stamped flange member slidably fitted over each termination and abutting against each said snap ring for purpose of drawing said terminations together, said stamped member having an S-shape in cross-section with work hardened corners, a compressible annulus separating the end surfaces of said terminations, a hard inner ring confined by said counter bores within said compressible annulus, the inner surface of said ring lying substantially flush with that portion of the inner surface of each said pipe termination which adjoins said counter bores, and having a plurality of grooves in each face through said hard inner ring to vent the outer surface of said inner ring, and means including said flange members and snap rings for clamping said terminations together to form a vacuum-tight seal capable of supporting not less than atmospheric pressure outside said vacuum system and $10^{-8}$ torr inside said vacuum system—between the compressible annulus and the three surfaces surrounding it, namely the end surfaces of the terminations and the outer surface of the inner ring, said hard inner ring serving to position said compressible annulus between said end surfaces and to limit the longitudinal movement of said terminations in order to prevent excessive deformation of said compressible annulus and said bevel serving to restrain said compressible annulus from being extruded from between the faces of said terminations.

References Cited

UNITED STATES PATENTS

| | | | |
|---|---|---|---|
| 813,454 | 2/1906 | Schaad | 285—363 |
| 2,602,678 | 7/1952 | Makoff et al. | 285—408 |
| 2,761,707 | 9/1956 | Herman | 285—367 |
| 2,944,842 | 7/1960 | Stiff | 285—368 |

FOREIGN PATENTS 870,347　3/1953　Germany.

MARION PARSONS, JR., Primary Examiner

WAYNE L. SHEDD, Assistant Examiner

U.S. Cl. X.R.

285—106, 368, 414